United States Patent [19]
Carabet et al.

[11] 3,771,255
[45] Nov. 13, 1973

[54] AUDIO VISUAL TOY

[75] Inventors: George F. Carabet, Palos Verdes Peninsula; Andrew M. Holland, Los Angeles; Joseph P. Morris, Huntington Beach; William B. Pester, Palos Verdes Peninsula; Harold A. Osborne, Fullerton; William Hart, Palos Verdes Peninsula, all of Calif.

[73] Assignee: Mattel, Inc., Hawthorne, Calif.

[22] Filed: Dec. 28, 1971

[21] Appl. No.: 213,003

[52] U.S. Cl. ........................ 46/33, 274/1 B, 35/8 A
[51] Int. Cl. ........................ A63h 33/30
[58] Field of Search ................. 46/33; 35/8 A, 35 C, 35/60; 274/1 B

[56] References Cited

UNITED STATES PATENTS

| | | | |
|---|---|---|---|
| 3,238,644 | 3/1966 | Hayes | 46/33 X |
| 2,110,381 | 3/1938 | Lohr | 46/33 |
| 3,344,709 | 10/1967 | Taylor | 35/8 A |
| 2,159,839 | 5/1939 | Bregman | 46/33 |
| 2,110,380 | 3/1938 | Lohr | 46/33 |

*Primary Examiner*—Louis G. Mancene
*Assistant Examiner*—D. L. Weinhold
*Attorney*—Seymour A. Sholnick

[57] ABSTRACT

Mechanical means automatically synchronizes picture to be viewed with a recorded message related to the picture being viewed. A unitary picture-record disc has circumferentially-spaced pictures and lead-in groove bearing a predetermined spaced-apart relationship so that indexing the disc to bring a particular picture into viewing position automatically brings the correct lead-in groove into playing position where stationary record is played by a rotating tone arm which is automatically stopped at the same predetermined rotated position after each record playback.

9 Claims, 16 Drawing Figures

AUDIO VISUAL TOY

BACKGROUND OF THE INVENTION

The background of the invention will be set forth in two parts.

FIELD OF THE INVENTION

The invention pertains generally to the field of audio-visual toys and more particularly to such a toy having mechanical means for automatically synchronizing pictures to be viewed with a recorded message to be played.

DESCRIPTION OF THE PRIOR ART

U.S. Pat. Nos. 2,005,914 and 3,436,083 are but two of the many prior art patents disclosing audio-visual devices.

U.S. Pat. No. 2,005,914 discloses a device wherein an audio-visual record is provided which remains stationary while a picture is in viewing position and a recorded message is played by a rotating tone arm.

U.S. Pat. No. 3,436,093 discloses a device wherein a picture disc carries a spindle on which a phonograph record is rotatably mounted. Rotation of the disc to bring a particular picture in viewing position also rotates a cam carried by the spindle for positioning the tone arm radially to a predetermined recorded message applicable to the picture then in viewing position.

OBJECTS AND SUMMARY OF THE INVENTION

It is a primary object of the present invention to provide a new and useful audio-visual toy exemplifying improvements over prior art audio-visual devices.

Another object of the present invention is to provide an audio-visual toy of the type described including mechanical means for automatically synchronizing pictures to be viewed with a recorded message to be played.

A further object of the present invention is to provide means in a device of the type described for automatically stopping a tone arm at a predetermined rotated position at the end of play of a recorded message.

According to the present invention, an audio-visual device is provided which includes recorded-message carrier means having a plurality of sound tracks including lead-in grooves having a predetermined spaced-apart relationship.

The device also includes picture-carrier means immovably mounted on the recorded-message carrier means and a plurality of picture transparencies mounted on the picture-carrier means with at least some of the transparencies being in the same spaced-apart relationship as the lead-in grooves, whereby indexing the recorded message carrier means to bring a particular transparency into viewing position automatically brings an associated one of the lead-in grooves into playing position.

The device also includes projection means for projecting the transparencies onto a viewing surface and sound-reproducing means for reproducing sounds recorded in the sound track. The sound-reproducing means includes sound pickup means and means for automatically bringing the sound pickup means into playing position on the proper lead-in groove when the audio-visual device is energized.

Indexing means are provided for indexing the recorded-message carrier means to bring predetermined transparencies into viewing position.

An off-axis elliptical reflector is used in the projection means to improve performance of the projection system.

The sound tracks are interleaved and the lead-in grooves are circumferentially spaced about the inner periphery of the recorded-message carrier means so that the rotated position thereof determines which lead-in groove will be played. The pickup means is swingably mounted on a rotatable carrier which is automatically stopped at the predetermined rotated position at the end of play. This predetermined rotated position corresponds to the rotated position of the lead-in groove for the transparency then in viewing position.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which like reference characters refer to like elements in the several views.

DESCRIPTION OF THE PREFERRED EMBODIMENT

Figure 1:
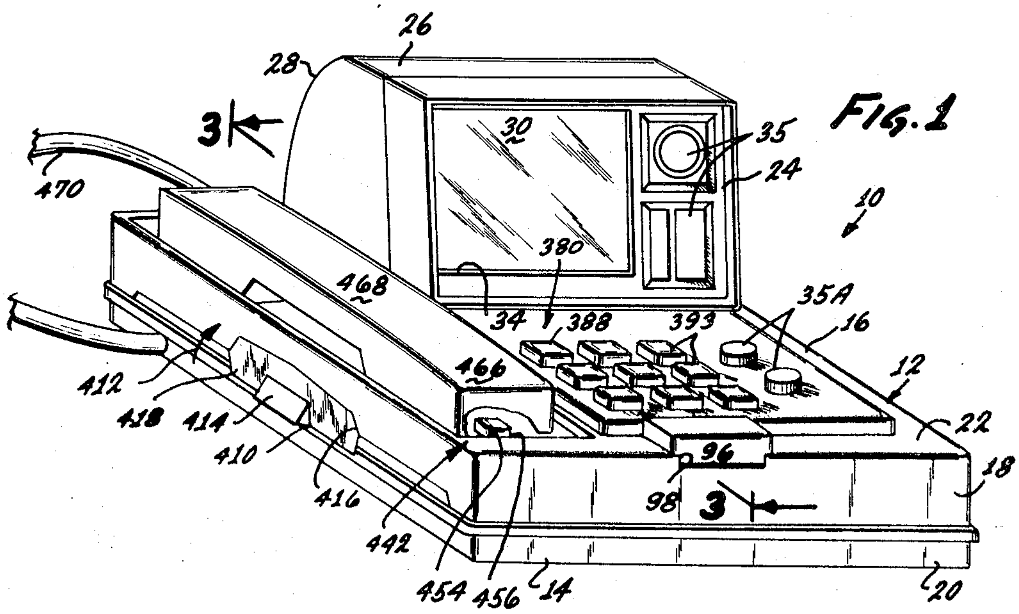
FIG. 1 is a perspective view of a videophone toy incorporating an audio-visual device of the present invention.
Figure 2:
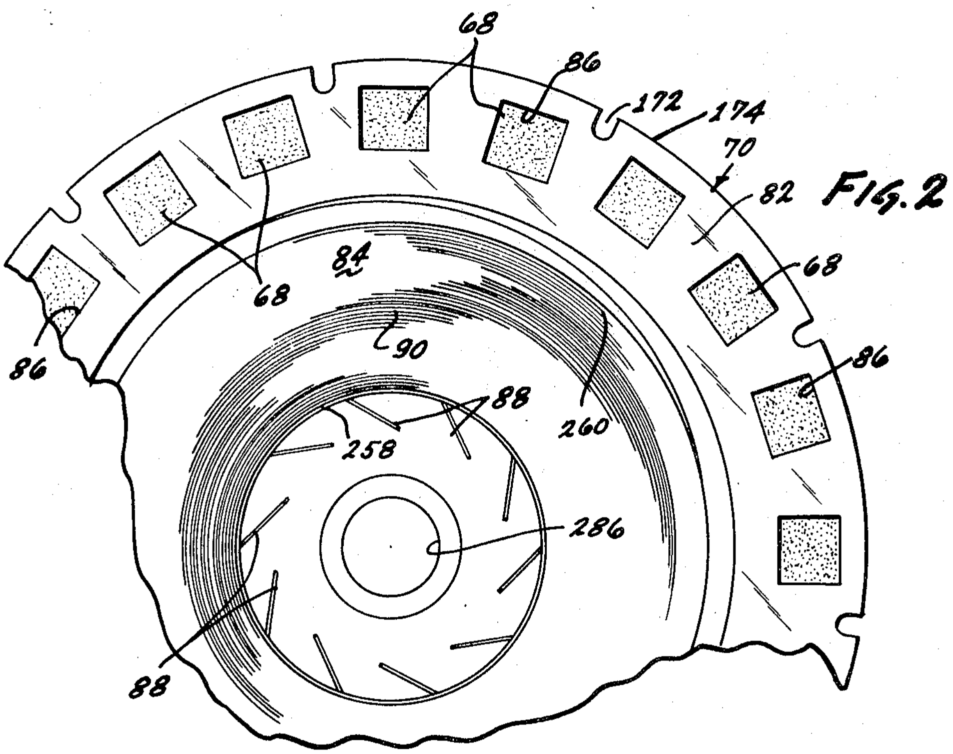
FIG. 2 is a partial plan view of a unitary audio-visual record used in the device of FIG. 1.
Figure 3:
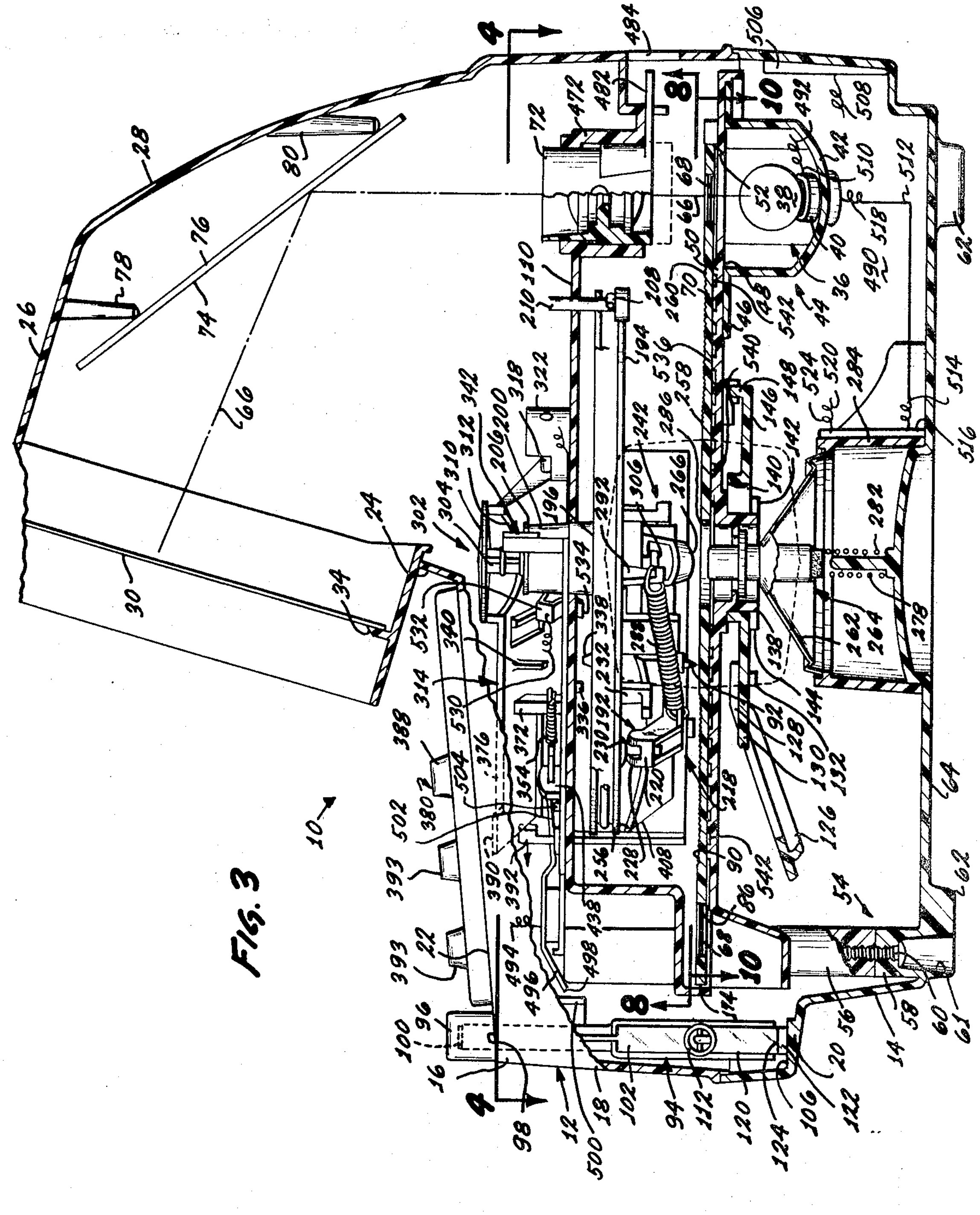
FIG. 3 is an enlarged, cross-sectional view taken along line 3—3 of FIG. 1.

Referring again to the drawings, and more particularly to FIGS. 1–3, an audio-visual device constituting a presently preferred embodiment of the invention, generally designated 10, includes a housing 12 comprising a base member 14 and a cover member 16. Cover member 16 includes an encompassing side wall 18 which surrounds the upstanding encompassing side wall portion 20 of base member 14, a substantially horizontal, lower top wall 22, an upstanding front wall 24, an upper top wall 26 and an upstanding rear wall 28. A translucent viewing screen 30 is mounted in an opening 34 formed in front wall 24, together with non-functional, simulated television controls 35, during a suitable molding operation wherein cover member 16 is formed from a suitable plastic material such as polystyrene, as a one-piece uint. Non-functional, simulated television control knobs 35A are also formed on lower top wall 22.

Audio-visual device 10 also includes a light source 36 (FIG. 3) having an electric light bulb 38 secured in a socket 40 formed in the bottom wall 42 of a reflector 44 having a peripheral flange 46 secured to the lower surface 48 of a horizontal plate 50 by suitable fastening means (not shown). A light opening 52 is provided in plate 50 above bulb 38.

Plate 50 may be supported in housing 12 by a plurality of securement means, like the one shown at 54 in FIG. 3 wherein a boss 56 depends from plate 50 and is connected to an upstanding boss 58 by a screw 60 inserted through an opening 61 provided in a leg 62 formed on bottom wall 64 of base member 14 during a suitable molding operation wherein base member 14 is molded from a suitable plastic material, such as polystyrene.

Light rays 66 from bulb 38 pass through opening 52 in plate 50, a suitable picture transparency 68 carried by an audio-visual record 70, and a condensor lens 72. Light rays 66 are then reflected from the front surface 74 of a mirror 76 mounted in housing 12 on posts 78, 80 depending from top wall 26 and rear wall 28, respectively. Light rays 66 are reflected by mirror 76 onto screen 30, which may be made from a suitable material such as a nucleated polypropylene injection molded in a mold having a sandblasted finish.

Figures 10, 11:
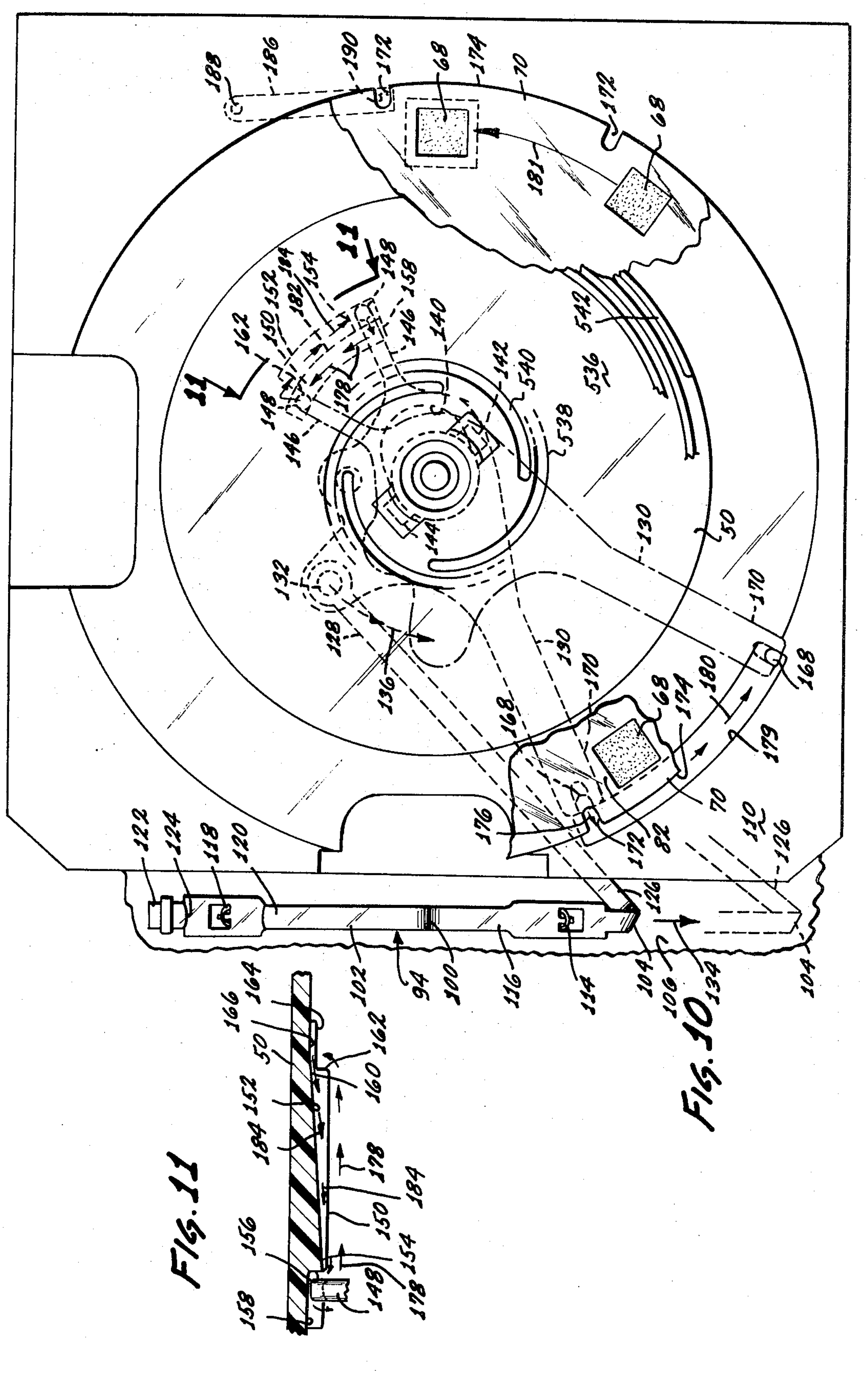
FIG. 10 is an enlarged, partial cross-sectional view taken along line 10—10 of FIG. 3.
FIG. 11 is an enlarged, partial cross-sectional view taken along line 11—11 of FIG. 10.

Referring now to FIGS. 2, 3 and 10, audio-visual record 70 may comprise any suitable unitary picture-carrying phonograph record or recorded-message carrier means and is shown herein for purposes of illustration, but not of limitation, as being of the same type as the audio-visual record shown and described in copending application Ser. No. 163,160, filed July 16, 1971 and incorporated herein by reference. Record 70 may comprise a unitary picture ring portion 82 and a groove-carrying disc portion 84 having uniformly spaced openings 86, phonograph-needle lead-in grooves 88 and recorded-message grooves or sound tracks 90 provided thereon. Suitable transparencies, like the one shown at 68 in FIG. 3, may be mounted in openings 86 with every other transparency being reversed so that record 70 may have recorded messages provided on both sides for use by playing one side and showing one half the pictures mounted in openings 86 and then turning the record over to play the recorded messages provided on the other side while showing the other half of the pictures mounted in openings 86.

Although record 70 remains stationary while a rotating phonograph needle 92 tracks the recorded-message grooves 90, record 70 may be indexed by incrementally rotating it with a suitable indexing means 94 for bringing different transparencies 68 into viewing position over opening 58 and bulb 38.

Referring now to FIGS. 1, 3, 4, 10 and 11, indexing means 94 includes a control button 96 (FIG. 1) reciprocably mounted in an opening 98 provided in housing 12.

Button 96 engages the hinged portion 100 of a four-bar linkage 102 including a first bar 104 slidably mounted on a shoulder 106 upstanding from bottom wall 64 of bottom housing member 14. First bar 104 is guided during reciprocation by side wall 20 and by a flange 108 (FIG. 4) carried by a platform 110 mounted on plate 50 and is biased to the position shown in solid lines in FIGS. 4 and 10 by a spring 112 (FIG. 4) having a first end 114 connected to a second bar 116 formed integrally with first bar 104 and a second end 118 hooked onto a third bar 120 connected to bar 116 by hinge 100 and to a fixed fourth bar 122 by a hinge 124.

First bar 104 includes a reversely-bent portion 126 having an end 128 (FIG. 10) connected to an indexing arm 130 by a pin 132 formed integrally with portion 126 during a suitable molding operation wherein linkage 102 is formed as a unitary structure from a suitable plastic, such as polypropylene. When first bar 104 is moved in the direction of arrow 134 to its FIG. 10 broken line position, pin 132 follows the path defined by arrow 136 moving indexing arm 130 counterclockwise to the position shown in FIG. 10 in dash-dot lines. As best seen in FIG. 3, record 70 rests on top of plate 50 and reversely-bent portion 126 and indexing arm 130 are mounted below plate 50 on a hollow, depending boss 138 which engages an elliptical slot 140 provided in indexing arm 130 and which carries lateral tabs 142, 144 for holding indexing arm 130 in position thereon. Indexing arm 130 includes a tail piece 146 which carries an upstanding pin 148 adapted to follow a path defined by a pair of arcuate ramps 150, 152 depending from plate 50 (FIGS. 3, 10 and 11). Ramp 152 includes an elevated end 154 forming a depending shoulder 156 adjacent the low end 158 of ramp 150. Ramp 152 also includes a low end 160 adjacent a shoulder 162 formed by the high end 164 of ramp 150. A transition section 166 slopes downwardly from end 164 to the low end 160 of ramp 152.

When first bar 104 is moved in the direction of arrow 134, pin 132 exerts a force on indexing arm 130 in the direction of arrow 136 causing pin 148 to ride along shoulder 156 until pin 148 reaches the low end 158 of ramp 150 for bringing a nib 168, provided on the end of a leg 170 of indexing arm 130, into engagement with an indexing notch 172 provided at the peripheral edge 174 of record 70 by moving nib 168 in the direction of arrow 176. Continued movement of bar 104 in the direction of arrow 134 moves pin 148 along ramp 150 in the direction of arrows 178 causing nib 168 to travel along an arcuate slot 179 in plate 50 and index record 70 in the direction of arrows 180 to move transparency 68 in the direction of arrow 181 and place it in viewing position at opening 52. An arcuate rib 182 is engaged by pin 148 during its movement in the direction of arrows 178 for assuring that nib 168 will follow the path defined by arrows 180 until indexing arm 130 reaches its dash-dot line position indicating the end of one complete indexing stroke. At this time, pin 148 will be on transition section 166 adjacent shoulder 162 which will cause pin 148 to move along a straight line toward the low end 160 of ramp 152. Bar 104 is then returned to its full-line position by spring 112. Additionally, pin 148 will move along ramp 152 in the direction of arrows 184 and drop off shoulder 156 leaving indexing arm 130 in its dash-line position ready for the next indexing stroke.

Record 70 may be retained in a particular rotated position by a detent spring 186 (FIG. 10) secured beneath platform 110 by a cold-headed pin 188 and including a spring-loaded protuberance 190 engageable in notches 172.

Referring now to FIGS. 3–9, the audio portion of record 70 may be reproduced by a sound-reproducing means 192 including a turntable 194 having a hollow spindle 196 rotatably journalled in a low-coefficient-of-friction plastic sleeve 198 (FIGS. 5 and 6) mounted in a plastic collar 200 formed integrally with a domed portion 202 of platform 110. Spindle 196 has an upper end 204 swaged over a metal washer 206. Turntable 194 may be die cast from a suitable metal, such as zinc and is driven by a belt 208 trained about the output shaft 210 (FIG. 8) of an electric motor 212 resiliently mounted by an elastomeric spider 214 (FIG. 4) in a motor housing 216 formed integrally with platform 110.

Sound-reproducing means 192 also includes a tone arm assembly 218 having a first end 220 provided with a frusto-conical bore 222 (FIG. 8A) rockably and swingably connecting tone arm 218 to a pivot pin 224 depending from turntable 194 and formed integrally therewith during the die-casting operation in such a manner that an arcuate shoulder 226 is formed thereon for engagement by a pair of arcuate rockers 228, 230 (FIGS. 3 and 8A) formed on end 220 of tone arm 218. End 220 of tone arm 218 is free to slide a short distance up-and-down on pin 224 and is prevented from becoming detached therefrom by a tab 232 which depends from turntable 194 and which is engaged beneath an arcuate web 234 formed on end 220 of tone arm 218 and including a depending tang 236 engageable with tab 232 for stopping tone arm 218 in one of its rotated positions. Tone arm 218 also includes a second end 238 which carries phonograph needle 92 engageable with record 70 for tracking recorded message grooves 90 receiving vibrations therefrom. These vibrations are transmitted by the upper surface 240 of end 238 of tone arm 218 (FIG. 8A) to a flapper bar 242 swingably connected to turntable 194 by a pair of trunnions 244, 246 (FIG. 8) rotatably mounted in saddles 248, 250, respectively, depending from turntable 194. Trunnion 246 carries a pip or tab 252 which is trapped between saddle 250 and a depending plate 254 for preventing displacement of trunnion 246 from saddle 250 during axial movement of trunnion 246.

Flapper bar 242 includes an arcuate plate 256 along which upper surface 240 of tone arm 218 slides during playing of groove-carrying portion 84 of record 70 from its inner periphery 258 to its outer periphery 260 for transmitting vibrations from needle 92 to a speaker cone 262 through its piston 264 and a piston-engaging member 266 forming an integral part of flapper bar 242. Flapper bar 242 is biased to turn clockwise about trunnion 246 (as viewed in FIG. 8A) by a spring 268 having a first end 270 connected to a spring hook 272 on flapper bar 242 and a second end 274 (FIG. 8) connected to a spring hook 276 depending from turntable 194. Spring 268 exerts a force just sufficient to engage needle 92 with record 70 against the force exerted by a spring 278 (FIGS. 3, 5 and 6) having a first end 280 seated in piston 264 and a second end 282 seated against fixed speaker horn 284 for biasing piston 264 into engagement with piston-engaging member 266 on flapper bar 242 when it is in the position shown in FIG. 6 where it extends through an opening 286 in record 70.

Figure 5:
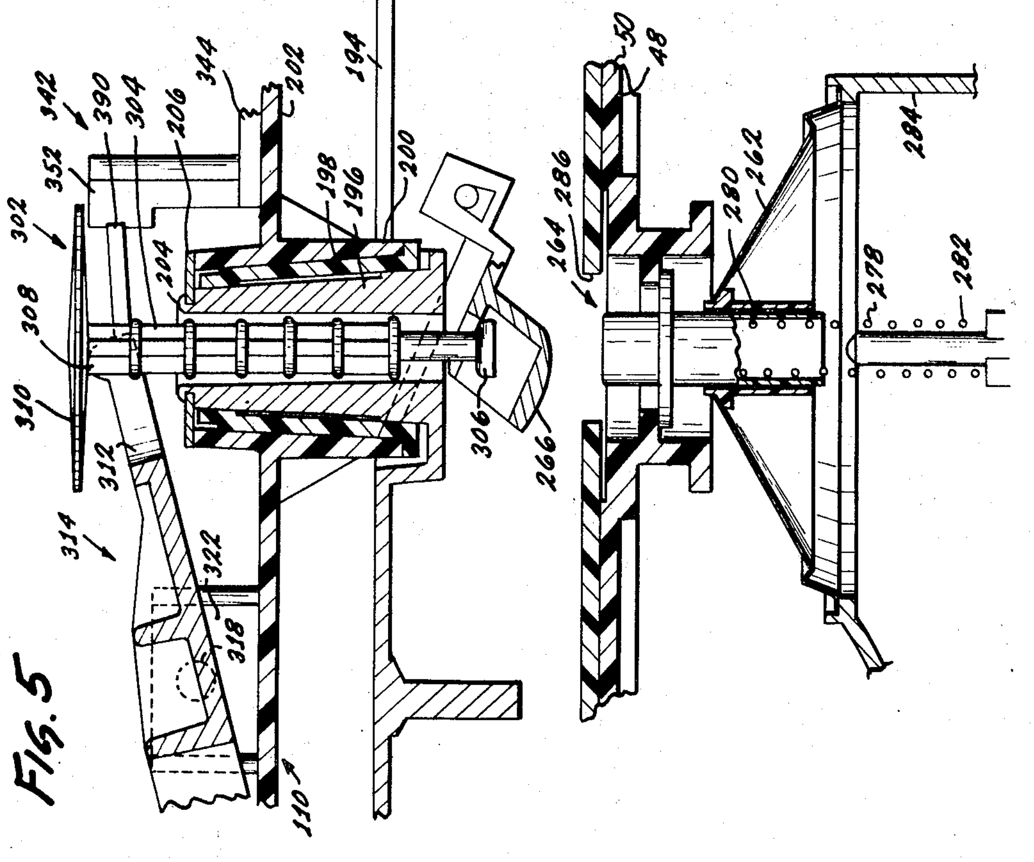
FIG. 5 is an enlarged, partial cross-sectional view taken along line 5—5 of FIG. 4 showing the parts in a first operating position.

FIGS. 3 and 5 show flapper bar 242 in an elevated position with tone arm 218 in its returned position wherein needle 92 is over the inner periphery 258 of record 70. Tone arm 218 is biased to this position by a tone arm-return spring 288 (FIGS. 3, 8 and 8A) having a first end 290 connected to a hook 292 depending from turntable 194 and a second end 294 connected to tone arm 218. Tone arm 218 is stopped in this returned position by a tone arm stop member 296 having a hook 298 extending over flapper bar 242 for preventing tone arm 218 from becoming disengaged from flapper bar 242 when tone arm stop member 296 engages a fixed web or stop 300 which establishes the correct starting position for needle 92.

Flapper bar 242 is elevated to its FIGS. 3 and 5 position by a flapper lifter 302 comprising a shaft 304 extending through turntable spindle 196 and having a first end 306 connected to flapper bar 242. Shaft 304 has a second end 308 which carries an enlarged head 310 seated in an arcuate opening 312 provided on a lifting lever 314 swingably mounted on domed portion 202 of platform 110 by a pair of trunnions 316, 318 (FIGS. 4 and 9) journalled in fixed mounts 320, 322, respectively, formed integrally with domed portion 202. Lifting lever 314 is biased to the elevated position shown in FIGS. 3 and 5 by a spring 324 (FIG. 4) having a coiled portion 326 cradled in a trough 328 provided in lifting lever 314, a first arm 330 engaged under a clip 332 carried by lifting lever 314, and a second arm 334 engaged under domed portion 202.

It will be apparent to those skilled in the art that the lead-in groove 88 (FIG. 2) for a particular transparency 68 must be under phonograph needle 92 (FIGS. 3 and 8A) at the beginning of play so that the sound for a particular transparency will automatically be played when device 10 is energized. To accomplish this, it is essential that turntable 194 be stopped at the same rotated position at the end of the playing of each recorded message. This is accomplished by providing a fixed stop 336 (FIGS. 3 and 8A) which depends from domed portion 202 in the path of travel of an upstanding finger 338 on flapper bar 242 which extends upwardly through an opening 335 provided in turntable 194 and engages stop 336 only when flapper bar 242 is in the elevated position shown in FIGS. 3 and 5. If, for some reason, finger 338 becomes wedged against stop 336 with sufficient tightness that spring 268 will not return flapper bar 242 to the playing position shown in solid lines in FIG. 8A when device 10 is again energized, a depending finger 340 on lifting lever 314 (FIG. 3) will pass through a suitable opening in domed portion 202 (not shown) and engage flapper bar finger 338 freeing it from stop 336.

Figure 6:
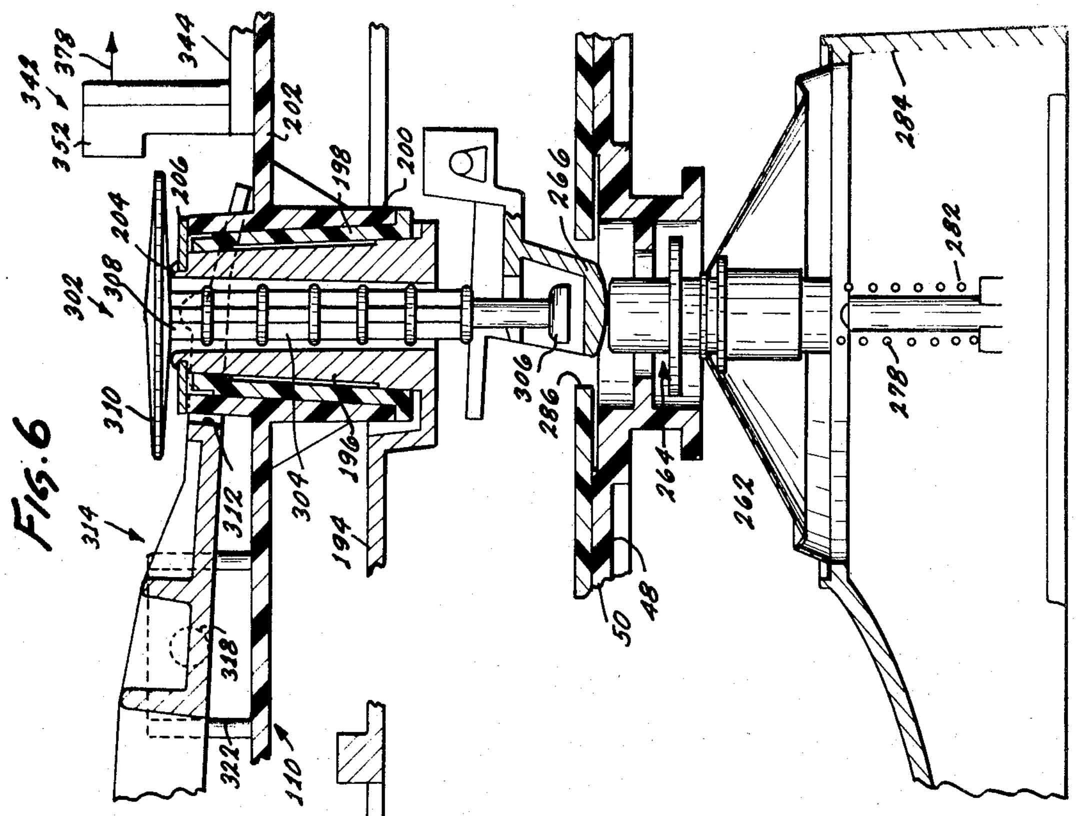
FIG. 6 is a partial, cross-sectional view similar to FIG. 5, but showing the parts in a second operating position.
Figure 8:
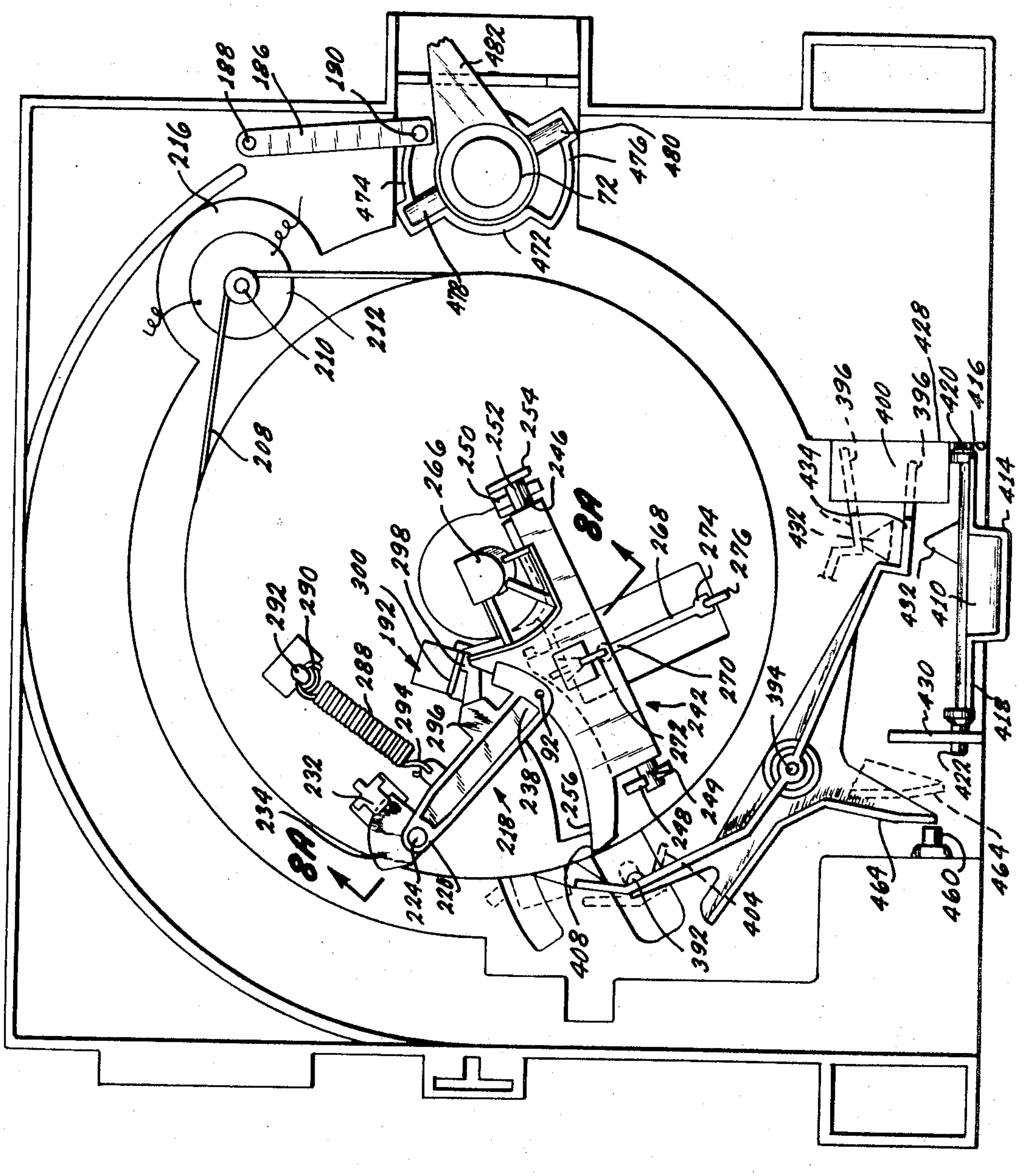
FIG. 8 is a cross-sectional view taken along line 8—8 of FIG. 3.
Figures 8A, 12, 13, 14, 15:
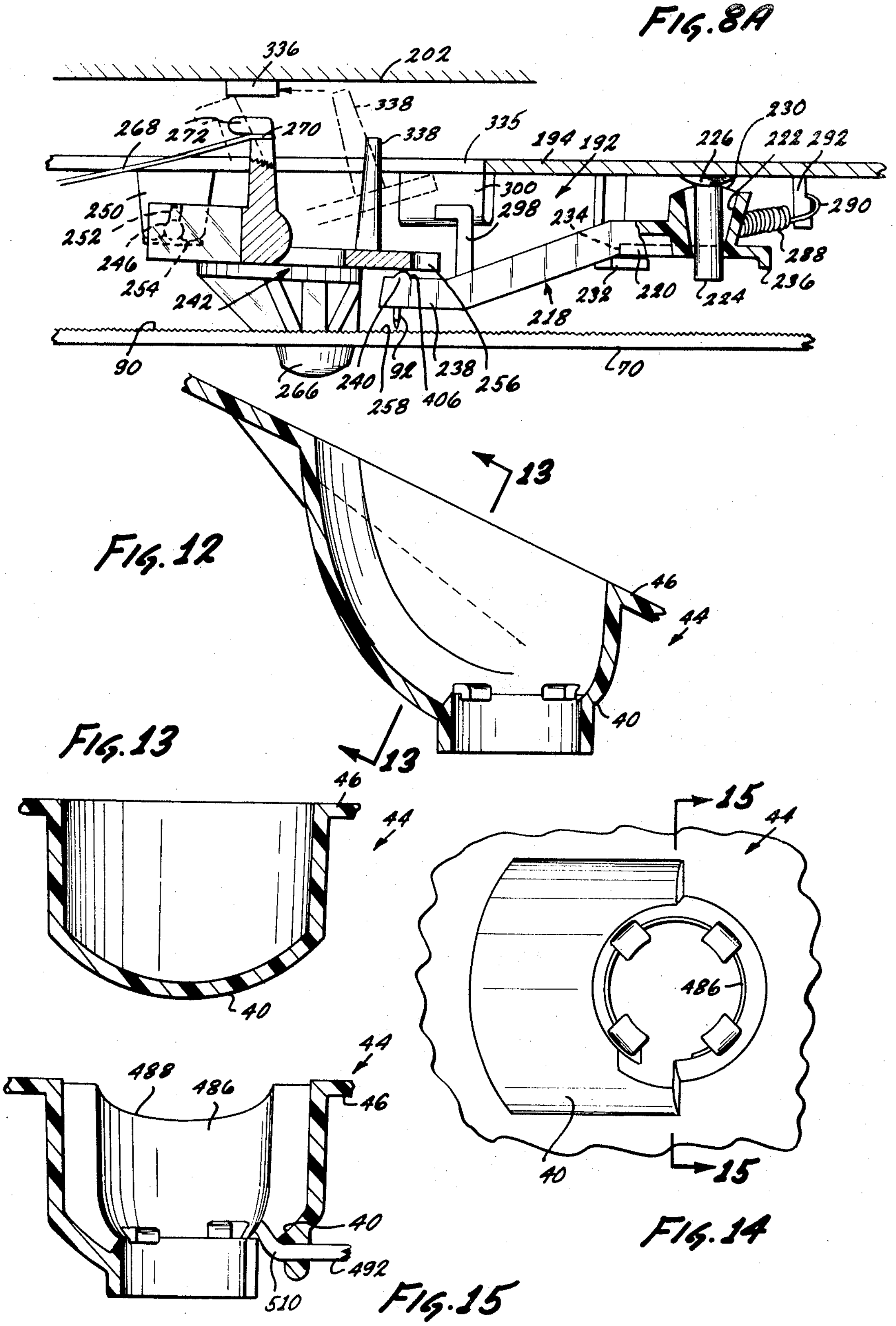
FIG. 8A is a partial, enlarged cross-sectional view taken along line 8A—8A of FIG. 8.
FIG. 12 is an enlarged, cross-sectional view of a reflector used in the projection system of the present invention.
FIG. 13 is a cross-sectional view taken along line 13—13 of FIG. 12.
FIG. 14 is a partial plan view of the reflector shown in FIG. 12.
FIG. 15 is a cross-sectional view taken along line 15—15 of FIG. 14.
Figure 9:
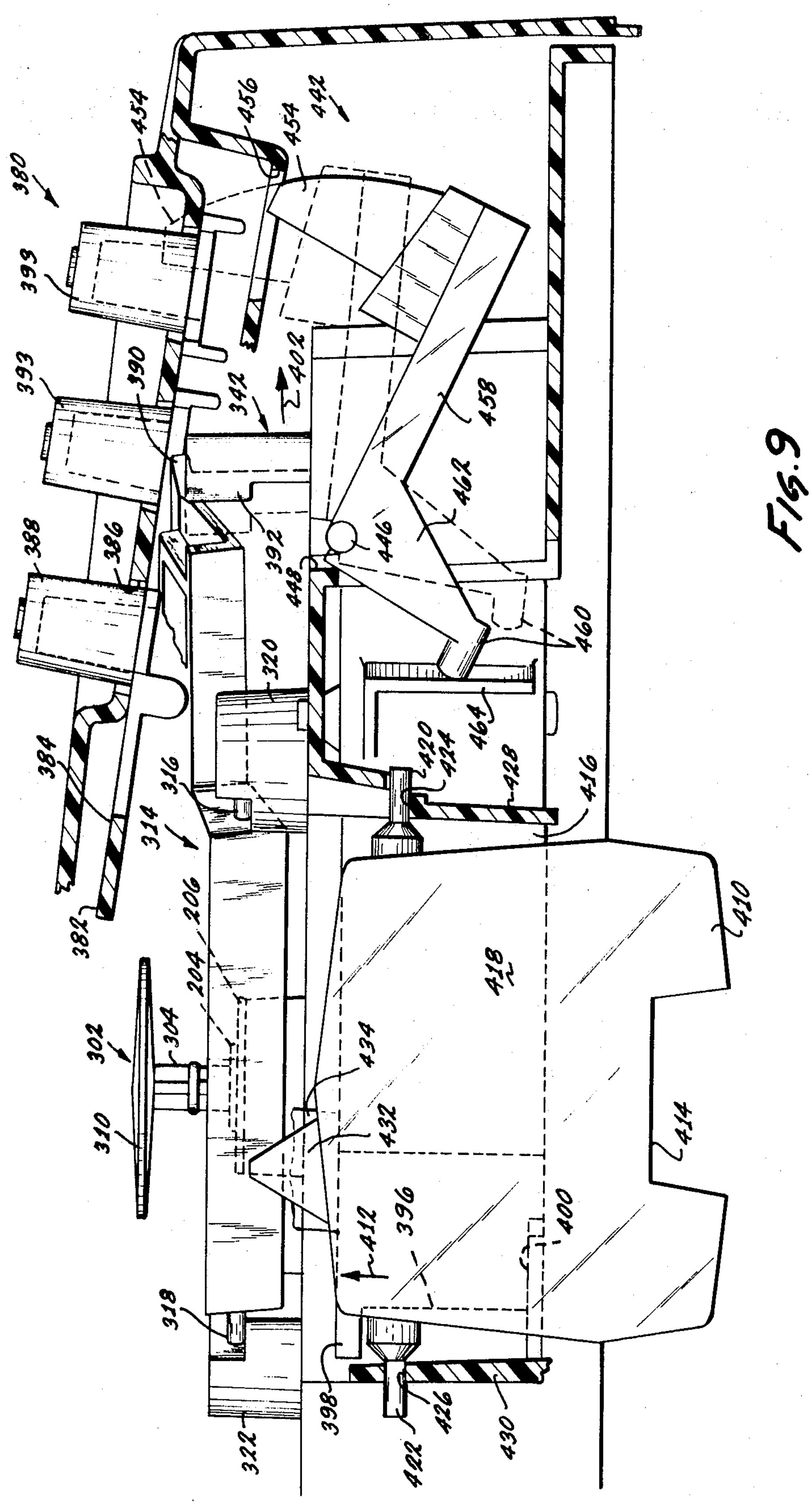
FIG. 9 is an enlarged cross-sectional view taken along line 9—9 of FIG. 4.

Referring now more in particular to FIGS. 5, 6 and 8A, flapper bar 242 automatically lowers needle 92 onto record 70 when flapper lifter 314 is moved from its FIG. 5 position to its FIG. 6 position. It will be apparent to those skilled in the art that unwanted displacement of lifter 314 to its FIG. 6 position when device 10 is dropped or the like could damage needle 92 or record 70 or both. Such unwanted displacement of lifter 314 is prevented by a safety stop assembly 342 (FIGS. 3–6) including an arm 344 having an end 346 (FIG. 4) swingably mounted on a fixed post 348 extending upwardly from domed portion 202 and a free, L-shaped end 350 normally holding an upstanding stop member 352 in position beneath button or head portion 310 of lifter 302. Stop member 352 is held in its normal position by a spring 354 having a first end 356 connected to arm 344 and a second end 358 connected to a hook 360 carried by a reset lever or start-stop latch 362 and extending upwardly through an opening 364 provided in domed portion 202. Spring 354 biases stop member 352 into position under button 310 and a pair of clips 366, 368, which are formed integrally with arm 344, prevent upward displacement of arm 344 by engaging the under surface of domed portion 202 adjacent an opening 370 provided therein.

Safety stop assembly 342 also includes a cam member 372 which is connected to arm 344 by a bracket 324 and which is normally disposed beneath the leading edge 376 of lifting lever 314 for engagement thereby during downward travel thereof (in the direction of domed portion 202) to swing stop assembly 342 clockwise about post 348 (as viewed in FIG. 4) thereby moving stop member 352 in the direction of arrow 378 (FIG. 6) from its FIG. 5 position beneath button 310 to its FIG. 6 position outside of button 310 which is then free to move from its FIG. 5 position to its FIG. 6 position under the influence of flapper bar spring 268 (FIG. 8A). Thus, lifting lever 314 not only automatically lifts flapper lifter 302 under the influence of spring 324, but also controls the lowering of lifter 302 when lever 314 is rotated in a clockwise direction, as viewed in FIG. 6. Such rotation of lever 314 may be accomplished by an actuator means 380 (FIGS. 1, 4 and 9) including a lever 382 (FIG. 9) swingably mounted beneath lower top wall 22 by suitable means (not shown). Lever 382 includes an end 384 extending into an opening 386 which is provided in wall 22 for receiving an actuating button 388 affixed to end 384 and extending upwardly through opening 386. An actuating finger 390 extends forwardly from the leading edge 376 of lifting lever 314 for engagement by end 384 to rotate leve 314 in a clockwise direction (as viewed in FIG. 9), thereby lowering leading edge 376 against cam 372 and against the bias of spring 324. Lever 314 may be locked in this position by a latch 392 (FIGS. 3, 4, 7 and 9) carried by reset lever 362. Button 388 simulates a button on a push-button type telephone. Operation of such a telephone may be simulated by providing additional buttons 393 which are depressible, but which have no function.

Referring now to FIGS. 3, 4 7, 8 and 9, reset lever 362 is swingably mounted under domed portion 202 of platform 110 on a pin 394 depending from domed portion 202 and includes a first end 396 having a short finger 398 (FIG. 9) riding on a shelf 400 forming a part of platform 110. Shelf 400 supports end 396 during swinging movements of reset lever 362 about pin 394. Clip or latch 392 is automatically moved in the direction of an arrow 402 each time sound reproducing means 192 completes the playing of a particular recorded message. When tone arm 218 reaches the end of play at the outer periphery 260 of record 70, end 238 of tone arm 218 engages a vertical rib 404 provided on reset lever 362 adjacent latch 392. Tone arm 218 is momentarily locked in this position by a shoulder 406 (FIG. 8A), formed on the upper surface 240 of tone arm 218, engaging edge 408 (FIGS. 3 and 8) of flapper bar 242. Start-stop latch or reset lever 362 then swings counterclockwise, as viewed in FIG. 8, releasing clip 392 from lifting lever 314 which then lifts flapper lifter 302, flapper bar 242 and tone arm 218. Spring 288 then swings tone arm 218 to its FIG. 3 position where needle 92 is stopped at the inner periphery 258 of record 70 by the engagement of tone arm stop 296 with fixed stop 300.

Clip 392 on lever 362 is also moved in the direction of arrow 402 when an access door 410 (FIGS. 1, 4, 8 and 10) is swung upwardly in the direction of arrow 412 by grasping its handle 414 for gaining access to record 70 through an access opening 416 (FIG. 1) provided in housing 12. Access door 410 includes a cover portion 418 partially covering opening 416 and is swingably mounted on platform 110 by a pair of trunnions 420, 422 pivotally mounted in notches 424, 426 provided in upstanding plates 428, 430, respectively. Door 410 carries a cam 432 engageable with an upstanding tab 434 provided on end 396 of latch 362 for moving end 396 in the direction of arrow 436 to the position shown in broken lines in FIGS. 4 and 8. This releases clip 392 from engagement with lifting lever 314 and positions an abutment 438 beneath actuating finger 390 for preventing lifter 314 from moving to its down position, thereby assuring that flapper bar 242 and needle 92 are always elevated when record 70 is being inserted into, or removed from, housing 12. Abutment 438 is carried by an arm 440 (FIG. 4) provided on latch 362 downstream of clip 392 and including a portion extending up through opening 364 adjacent spring hook 360. So long as door 410 is in an elevated position, cam 432 engages tab 434 swinging lever 362 sufficiently in the direction of arrow 436 to position abutment 438 beneath finger 390.

Referring to FIGS. 1, 4, 8 and 9, lever 362 may be swung in the direction of arrow 436 (FIGS. 4 and 8) to release clip 392 from engagement with lifting lever 314 by actuating a reset device 442 swingably mounted in housing 12 on a pair of trunnions 444, 446 seated in notches 448, 450 (FIG. 4) provided in an upstanding bracket 452 on platform 110 and in domed portion 202, respectively. Reset device 442 includes a button 454, extending up through an opening 456 provided in wall 22 of housing 12, a bracket 458, connecting button 454 to trunnions 444, 446, and an actuating pin 460, connected to trunnions 444, 446 by a plate 462. Pin 460 engages an offset finger 464 on lever 362 for moving finger 464 to the position shown in broken lines in FIG. 8 when button 454 is depressed to the position shown in solid lines in FIG. 9. This swings lever 362 sufficiently to release clip 392 and reset tone arm 218. It will be noted from FIG. 1 that reset button 454 is located beneath one end 466 of a simulated telephone handset 468 connected to speaker horn 284 (FIGS. 4, 5 and 6) by a conduit 470 for receiving sounds therefrom. When handset 468 is restored to its position on wall 22 of housing 12 before sound producing device 192 has finished playing record 70, handset 468 depresses reset button 454 terminating the playing of record 70 in simulation of terminating a real telephone conversation by hanging up the handset.

Figures 4, 7:
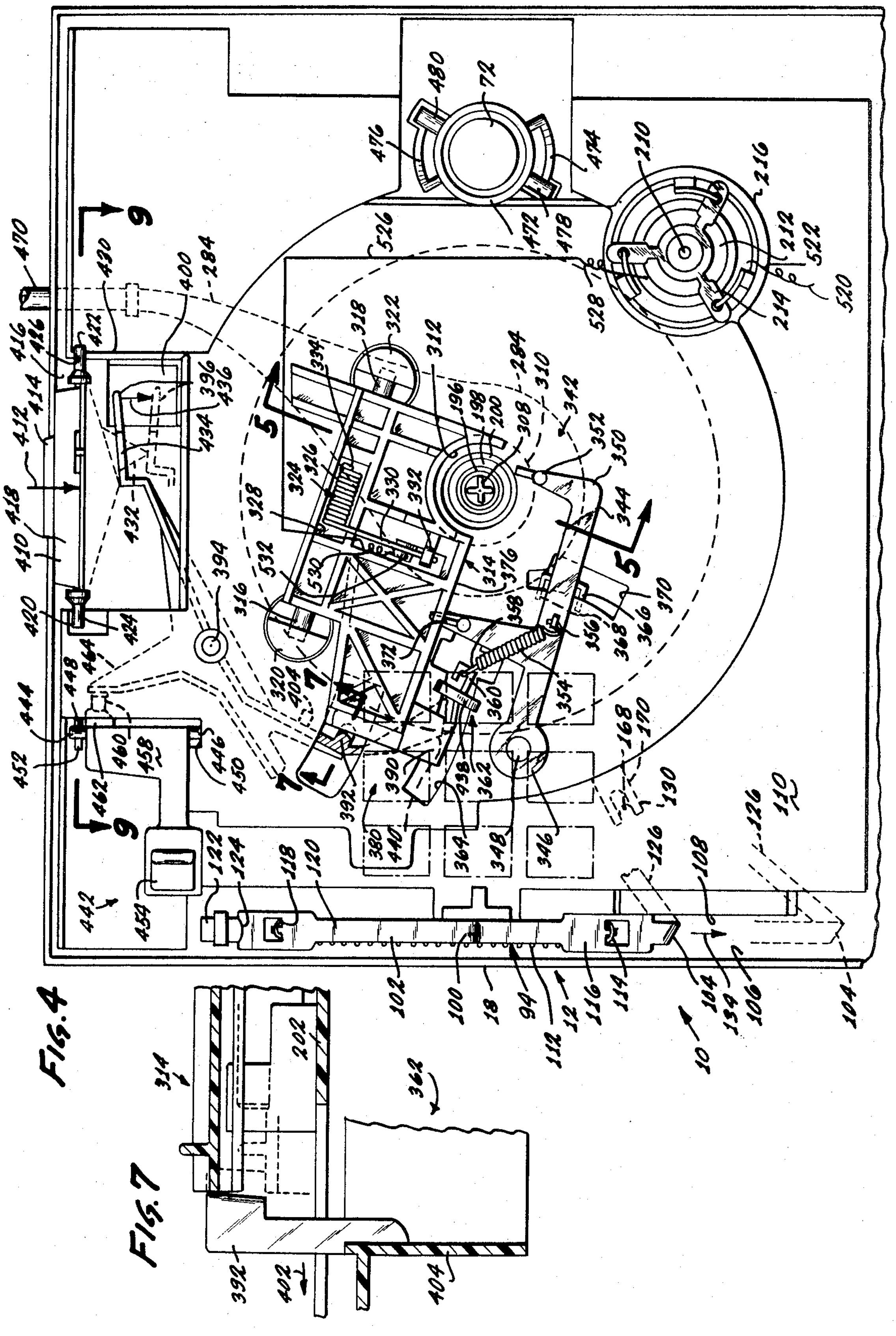
FIG. 4 is a cross-sectional view taken along line 4—4 of FIG. 3.
FIG. 7 is an enlarged, partial cross-sectional view taken along line 7—7 of FIG. 4.

As may be best seen in FIGS. 3, 4 and 8, lens 72 is rotatably mounted in a lens housing 472 which may be molded integrally with platform 110 and which includes stepped ways 474, 476 engaged by pins 478, 480 carried by lens 72 for moving it up-and-down when a lever 482, which is also carried by lens 72, is manipulated through an opening 484 provided in housing 12.

Referring now to FIGS. 12 – 15, reflector 44 may be an off-axis elliptical reflector having a small spherical portion 486 located on its rear side 488 for reinforcing light rays 66 at the film plane (not shown).

Electric current for operating light bulb 38 and electric motor 212 may be supplied by suitable dry cell means (not shown) which may be mounted in a battery housing 490 (FIG. 3). Such dry cell means may be connected to bulb 38 by a negative lead 492 having an end 494 connected to a movable contact 496 including an end 498 mounted in the path-of-travel of a finger 500 on control button 96 for temporarily energizing bulb 38 each time button 96 is depressed to index record 70 so that the transparency 68 which is in viewing position may be viewed until button 96 is released. Movable contact 496 also includes an end 502 which is depressed by lifting lever 314. Ends 498 and 502 of contact 496 engage a bus bar 504 connected to a fixed negative terminal 506 by a lead 508. Terminal 506 is mounted in battery housing 490 for engagement by the negative end of a dry cell (not shown). Lead 492 includes an end 510 (FIGS. 3 and 15) held in position adjacent bulb 38 by reflector 44. Bulb 38 may be connected to the positive side of the dry cell means by a lead 512 having a first end 514 connected to a fixed terminal 516 in battery housing 490 and a second end 518 positioned beneath socket 40 for engagement by the end of bulb 38.

Motor 212 may be connected to the positive side of the dry cell means by a lead 520 (FIGS. 3 and 4) having a first end 522 connected to motor 212 and a second end 524 connected to terminal 516 in battery housing 490. Motor 212 is connected to the negative side of the dry cell means by a lead 526 (FIG. 4) having a first end 528 connected to motor 212 and a second end 530 connected to a movable contact 532 mounted on top of domed portion 202 and adapted to pass downwardly through domed portion 202 into engagement with a clip 534 provided on bus bar 504. Movable contact 532 is moved into engagement with clip 534 by lever 314 when it is moved to its down or lower-most position and is moved upwardly out of engagement with clip 534 by finger 338 on flapper bar 242 just before finger 338 engages stop 336.

Since it is possible to energize device 10 without having a record 70 in position on top of plate 50, means are provided for quickly directing needle 92 to the outer periphery of plate 50 where tone arm 218 will engage lever 362 and de-energize sound reproducing means 192. These means are shown in FIGS. 3 and 10 wherein the upper surface 536 of plate 50 is provided with spiral grooves 538 which will be engaged by needle 92 if sound reproducing means 192 is energized without having a record 70 in position on plate 50. Grooves 538 rapidly carry needle 92 from the inner periphery 540 thereof to the outer periphery 542 thereof where tone arm 218 will engage lever 362 and de-energize sound reproducing means 192.

In use, a record 70 may be inserted through opening 416 into position on upper surface 536 of plate 50. If flapper bar 242 and tone arm 218 were not previously in the positions shown in FIG. 3, they would have been automatically moved to these positions by the opening of access door 410, as previously described.

Button 96 may then be actuated to index a transparency 68 into position over opening 52 above bulb 38. This indexing manipulation also automatically brings the correct lead-in groove 88 for transparency 68 into position beneath needle 92. Finger 500 on button 96 closes the circuit to bulb 38 during the downstroke of button 96 to indicate which picture will be seen on screen 30 when device 10 is energized by depressing button 388 into engagement with finger 390 on lifting lever 314. This rotates lifting lever 314 to its lowermost position where end 502 of movable contact 496 is pressed into engagement with bus bar 504 to complete a circuit to bulb 38 and movable contact 532 is pressed into engagement with clip 539 on bus bar 504 to complete a circuit to motor 212 causing turntable 194 to rotate. The lowering of lever 314 also releases flapper lifter 302 permitting flapper bar 242 to lower needle 92 onto record 70 and lower button or cone-engaging member 266 into engagement with piston 264. Rotation of turntable 194 swings tone arm 218 about a circle above record 70 while needle 92 tracks recorded-message grooves or sound tracks 90 for playing the recorded message related to transparency 68 which is projected onto screen 30 by bulb 38, lens 72 and mirror 76. This recorded message may simulate a telephone conversation with a child-user as he holds handset 468 to his ear to hear the recorded message and views the picture on screen 30. It will, of course, be understood that the user of device 10 may focus the picture on screen 30 by manipulating lever 482.

At the end of play of the recorded message, tone arm 218 will engage lever 362 swinging clip 392 out of engagement with lifting lever 362 which, in turn, will raise flapper lifter 302 causing flapper bar 242 and tone arm 218 to become elevated whereupon tone arm return spring 288 will swing tone arm 218 into position over the inner periphery 258 of record 70. Finger 338 on flapper bar 242 will then engage movable contact 532 and move it out of engagement with clip 534 de-energizing motor 212. Turntable 194 will then coast sufficiently to bring flapper bar finger 338 into engagement with fixed stop 336 stopping turntable 194 at the correct rotated position for positioning needle 92 over the lead-in groove 88 corresponding to the transparency 68 then in position over opening 50. Control button 96 may then be actuated to bring another transparency 68 into viewing position.

While the particular audio-visual device herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims, which form a part of this disclosure.

What is claimed is:

1. A toy video-phone, comprising:

a housing having a viewing screen and a simulated pushbutton telephone dialing means provided thereon;

a phonograph device mounted in said housing, said phonograph device including a speaker and phonograph record means;

means connecting a push-button of said simulated dialing means to said phonograph device for energizing said phonograph device to reproduce a selected recording;

a simulated telephone handset having a hollow tube connected to said speaker;

means controlled by said push-button for selecting and displaying pictures on said screen corresponding to said selected recording, during the reproduction of said record means;

a reset button connected to said phonograph device for de-energizing said phonograph device when said reset button is actuated; and cradle means provided on said housing for storing said handset when it is not in use, said reset button being mounted in said cradle means for actuation by said handset when it is placed in said cradle means.

2. An audio-visual phone as stated in claim 1 wherein said means for displaying pictures includes an off-axis, elliptical reflector having a rear surface formed by a small spherical portion for reinforcing light at a predetermined film plane.

3. A toy video-phone as stated in claim 1 wherein said picture displaying means includes an electric light bulb and switch means controlling the flow of electric current to said light bulb and wherein said toy includes means carried by said dialing means for actuating said switch means when said dialing means is actuated.

4. A toy video-phone as stated in claim 1 wherein said simulated dialing means simulates a push-button-type dialing means including a plurality of push buttons, wherein said picture displaying means includes indexing means for moving said pictures into viewing position on said screen screen, one of said push buttons being connected to said indexing means for actuating said indexing means, and wherein said picture displaying means includes an electric light bulb and switch means completing a circuit to said light bulb when said switch means is closed, said one of said push buttons carrying a finger engageable with said switch means when said one button is depressed to move a particular picture into viewing postion, whereby said switch means is closed so that said particular picture may be viewed so long as said one button remains depressed.

5. A toy video-phone as stated in claim 1 wherein said record means comprises:

recorded-message carrier means having a plurality of sound tracks including lead-in grooves having a predetermined spaced-apart relationship;

picture-carrier means immovably mounted on said recorded-message carrier means; and a plurality of picture transparencies mounted on said picture-carrier means, at least some of said transparencies being in the same spaced-apart relationship as said lead-in grooves, whereby indexing of said recorded-message carrier means to bring a particular transparency into viewing position automatically brings an associated one of said lead-in grooves into playing position; and wherein said phonograph device includes sound pickup means and means for automatically bringing said sound pickup means into playing position on said an associated one of said lead-in grooves when said phonograph device is energized.

6. A toy video-phone as stated in claim 6 wherein said phonograph device also includes:

a turntable rotatably mounted in said housing;

means swingably mounting said pickup means on said turntable;

a flapper bar rockably mounted on said turntable, said flapper bar including a member engageable with said speaker to transmit vibrations thereto;

means slidably connecting said pickup means to said flapper bar for transmitting vibrations from said pickup means to said flapper bar;

flapper-bar spring means connected to said flapper bar and to said turntable for rocking said flapper bar to bring said pickup means into engagement with said recorded-message carrier means and to simultaneously bring said speaker-engaging member into engagement with said speaker; and flapper-bar lifter means connected to said flapper bar for rocking it against the bias of said flapper-bar spring means to lift said pickup means off of said recorded-message carrier means when said flapper-bar lifter means is moved in a predetermined direction;

lifter spring means connected to said flapper-bar lifter means to move it in said predetermined direction, said lifter spring means being stronger than said flapper-bar spring means for lifting said flapper bar against the bias of said flapper-bar spring means; and latch means for locking said flapper-bar lifter means against the bias of said lifter spring means, said pickup means being automatically lifted from said recorded-message carrier means when said latch means is released from engagement with said flapper-bar lifter means, said means connecting said simulated dialing means to said phonograph device for energizing said phonograph device being engageable with said flapper-bar lifter means for moving it against the bias of said lifter spring means, whereby said flapper-bar spring means will rock said flapper bar to bring said pickup means into engagement with said recorded message carrier means, said pickup means automatically releasing said latch means at the end-of-play of said recorded-message carrier means.

7. A toy video-phone as stated in claim 1 wherein said picture displaying means includes indexing means for moving said pictures into viewing position on said screen and wherein said toy includes means connecting a push button of said simulated dialing means to said indexing means for actuation thereby to bring one of said pictures into viewing position.

8. A toy video-phone as stated in claim 9 wherein said indexing arm includes a hub portion provided with an elongated opening engaging a fixed cylindrical post in said housing, whereby said indexing arm is capable of rotating and sliding movements, said indexing arm including a tail piece having a pin provided thereon and wherein a pair of arcuate ramps are provided in said housing, said pin being engageable with said ramps for controlling the path-of-travel of said indexing arm when said one push button is pushed.

9. A toy-video phone, comprising:

a housing having a viewing screen and a simulated pushbutton telephone dialing means provided thereon;

a phonograph device mounted in said housing, said phonograph device including a speaker and phonograph record means;

means connecting a push-button of said simulated dialing means to said phonograph device for energizing said phonograph device to reproduce a selected recording;

a simulated telephone handset having a hollow tube connected to said speaker;

means controlled by said push-button for selecting and displaying pictures on said screen corresponding to said selected recording, during the reproduction of said record means;

a reset button connected to said phonograph device for de-energizing said phonograph device when said reset button is actuated; and cradle means provided on said housing for storing said handset when it is not in use, said reset button being mounted in said cradle means for actuation by said handset when it is placed in said cradle means;

said record means being a disc-type, unitary picture ring and phonograph record rotatably mounted in said housing for rotation in increments by said selecting means and wherein said selecting means includes an indexing arm connected to said selecting means and having an indexing leg engageable with said unitary picture ring and phonograph record for rotating it one increment when said one push button is pushed.

* * * * *